(12) United States Patent
Hsu

(10) Patent No.: US 9,354,482 B2
(45) Date of Patent: May 31, 2016

(54) CIRCULAR DISPLAY

(71) Applicant: E Ink Holdings Inc., Hsinchu (TW)

(72) Inventor: Suei-Shih Hsu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 14/197,235

(22) Filed: Mar. 5, 2014

(65) Prior Publication Data

US 2014/0327954 A1    Nov. 6, 2014

(30) Foreign Application Priority Data

May 6, 2013   (TW) ............... 102116116 A

(51) Int. Cl.
*G02F 1/167* (2006.01)

(52) U.S. Cl.
CPC ........ *G02F 1/167* (2013.01); *G02F 2001/1676* (2013.01); *G02F 2201/56* (2013.01)

(58) Field of Classification Search
CPC .......... G02F 1/13336; G02F 1/134309; G02F 1/167; H01L 27/3293
See application file for complete search history.

(56) References Cited

U.S. PATENT DOCUMENTS

| | | | | |
|---|---|---|---|---|
| 5,903,328 | A * | 5/1999 | Greene et al. | 349/73 |
| 7,170,468 | B2 * | 1/2007 | Knopf | 345/1.3 |
| 7,834,537 | B2 | 11/2010 | Kee et al. | |
| 2007/0220792 | A1 * | 9/2007 | Capurso et al. | 40/463 |
| 2008/0002527 | A1 * | 1/2008 | Ishii et al. | 368/239 |
| 2008/0174531 | A1 * | 7/2008 | Sah | 345/84 |

FOREIGN PATENT DOCUMENTS

| | | | | |
|---|---|---|---|---|
| CN | 201233480 | * | 5/2009 | ............... G02F 1/13 |
| JP | 2008107440 | | 5/2008 | |
| JP | 2010008480 | | 1/2010 | |
| TW | 200632806 | | 9/2006 | |
| WO | 2006064456 | | 6/2006 | |
| WO | 2012129247 | | 9/2012 | |

OTHER PUBLICATIONS

Office Action of China Counterpart Application, issued on Feb. 19, 2016, p. 1-p. 8.

* cited by examiner

*Primary Examiner* — Jordan Schwartz
*Assistant Examiner* — George G King
(74) *Attorney, Agent, or Firm* — Jianq Chyun IP Office

(57) ABSTRACT

A circular display includes a carrier and a display medium layer that is located on the carrier. The display medium layer has two display edges opposite to each other. The carrier has two carrying edges opposite to each other. The display edges are respectively aligned to the carrying edges. The carrier and the display medium layer are bent together to form a closed ring. The display edges of the display medium layer are connected to each other. The carrying edges of the carrier are connected to each other.

16 Claims, 8 Drawing Sheets

CIRCULAR DISPLAY

CROSS-REFERENCE TO RELATED APPLICATION

This application claims the priority benefit of Taiwan application serial no. 102116116, filed on May 6, 2013. The entirety of the above-mentioned patent application is hereby incorporated by reference herein and made a part of this specification.

BACKGROUND OF THE INVENTION

1. Field of the Invention

The invention relates to a display; more particularly, the invention relates to a circular display.

2. Description of Related Art

As the display technology advances drastically, various display devices have been indispensible in our daily lives. With the advantages of small volume, low power consumption, and so forth, the flat panel display (FPD) has become one of the mainstream display products. In general, the FPD includes a rigid substrate. To satisfy consumers' demands, however, displays with the flexible substrates, i.e., flexible displays, have been developed.

FIG. 1 illustrates a conventional flexible display. With reference to FIG. 1, if the conventional flexible display is rolled up to form a circular display, the resultant circular display may have spacer regions S due to the structure of the flexible display, and the spacer regions S cannot display image frames. Accordingly, the conventional circular display is not able to accomplish favorable display effects.

SUMMARY OF THE INVENTION

The invention is directed to a circular display capable of achieving favorable display effects.

In an embodiment of the invention, a circular display that includes a carrier and a display medium layer located on the carrier is provided. The display medium layer has two display edges opposite to each other. The carrier has two carrying edges opposite to each other. The display edges are respectively aligned to the carrying edges. The carrier and the display medium layer are bent together to form a closed ring. The display edges of the display medium layer are connected to each other. The carrying edges of the carrier are connected to each other.

According to an embodiment of the invention, the circular display further includes a first protection layer. The display medium layer is located between the first protection layer and the carrier. The first protection layer, the carrier, and the display medium layer are bent together to form the closed ring. The first protection layer has two first protection edges opposite to each other and two first protection edge areas, and each of the two first protection edge areas respectively has one of the first protection edges. A portion of one of the two first protection edge areas exceeds the display medium layer. The portion of the first protection edge area exceeding the display medium layer is stacked onto and fixed to the other one of the two first protection edge areas.

According to an embodiment of the invention, the circular display further includes a first adhesive layer. The first adhesive layer is located between the first protection layer and the display medium layer. The portion of the first protection edge area exceeding the display medium layer is fixed to the other one of the two first protection edge areas through the first adhesive layer.

According to an embodiment of the invention, the first protection edge of the other one of the first protection edge areas is aligned to one of the display edges.

According to an embodiment of the invention, the circular display further includes a second protection layer. The carrier is located between the display medium layer and the second protection layer. The second protection layer, the carrier, and the display medium layer are bent together to form the closed ring. The second protection layer has two second protection edges opposite to each other and two second protection edge areas, and each of the two second protection edge areas respectively has one of the second protection edges. A portion of one of the two second protection edge areas exceeds the display medium layer. The portion of the second protection edge area exceeding the display medium layer is stacked onto and fixed to the other one of the two second protection edge areas.

According to an embodiment of the invention, the circular display further includes a second adhesive layer. The second adhesive layer is located between the second protection layer and the carrier. The portion of the second protection edge area exceeding the display medium layer is fixed to the other one of the two second protection edge areas through the second adhesive layer.

According to an embodiment of the invention, the second protection edge of the other one of the second protection edge areas is aligned to one of the display edges.

According to an embodiment of the invention, the two display edges of the display medium layer are a first display edge and a second display edge. One of the first protection edges is aligned to the first display edge. A portion of the first protection edge area having the other one of the first protection edges exceeds the second display edge of the display medium layer. One of the second protection edges is aligned to the second display edge of the display medium layer. A portion of the second protection edge area having the other one of the second protection edges exceeds the first display edge of the display medium layer.

According to an embodiment of the invention, the circular display further includes a fixing member. The fixing member fixes the two display edges of the display medium layer and fixes the two carrying edges of the carrier.

According to an embodiment of the invention, two first protection edges are respectively aligned to the two display edges, and the two second protection are respectively aligned to the two display edges.

According to an embodiment of the invention, the fixing member is a third adhesive layer. The third adhesive layer is located between the display edges of the display medium layer, between the carrying edges of the carrier, between the first protection edges of the first protection layer, and between the second protection edges of the second protection layer. The display edges of the display medium layer are connected to each other through the third adhesive layer. The carrying edges of the carrier are connected to each other through the third adhesive layer. The first protection edges of the first protection layer are connected to each other through the third adhesive layer. The second protection edges of the second protection layer are connected to each other through the third adhesive layer.

According to an embodiment of the invention, the display edges of the display medium layer are in contact with each other; the carrying edges of the carrier are in contact with each other; the first protection edges of the first protection layer are in contact with each other; the second protection edges of the second protection layer are in contact with each other. The fixing member fixes the first protection edges of the first protection layer and fixes the second protection edges of the second protection layer.

According to an embodiment of the invention, the first protection layer has a first outer surface and a first inner surface opposite to each other. The first inner surface is located between the display medium layer and the first outer surface. The fixing member includes a first adhesive plate. The first adhesive plate is adhered to areas having the first protection edges in the first outer surface of the first protection layer.

According to an embodiment of the invention, the second protection layer has a second outer surface and a second inner surface opposite to each other. The second inner surface is located between the carrier and the second outer surface. The fixing member further includes a second adhesive plate. The second adhesive plate is adhered to areas having the second protection edges in the second outer surface of the second protection layer.

According to an embodiment of the invention, the first adhesive plate and the second adhesive plate are transparent.

According to an embodiment of the invention, the fixing member is a clamping member. The clamping member clamps an area of the display medium layer having the two display edges, an area of the carrier having the two carrying edges, an area of the first protection layer having the two first protection edges, and an area of the second protection layer having the two second protection edges.

According to an embodiment of the invention, the clamping member is transparent.

According to an embodiment of the invention, the circular display further includes a common electrode layer and an active device layer located between the display medium layer and the carrier. The display medium layer is located between the common electrode layer and the active device layer.

According to an embodiment of the invention, the medium layer is an electronic ink layer.

As is discussed above, in the circular display described herein, the carrier that holds the display medium layer is aligned to the display medium layer; therefore, when the display medium layer and the carrier are rolled up to form the circular display, the two display edges of the display medium layer may be very close to each other and may be connected together, such that the circular display is able to achieve the favorable display effects.

Several exemplary embodiments accompanied with figures are described in detail below to further describe the invention in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

First Embodiment

Figure 1:
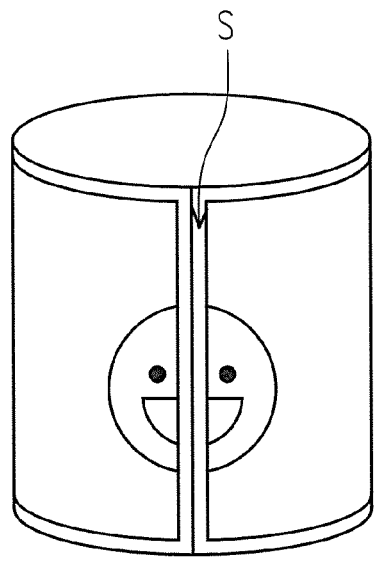
FIG. 1 illustrates a conventional flexible display.
Figure 2:
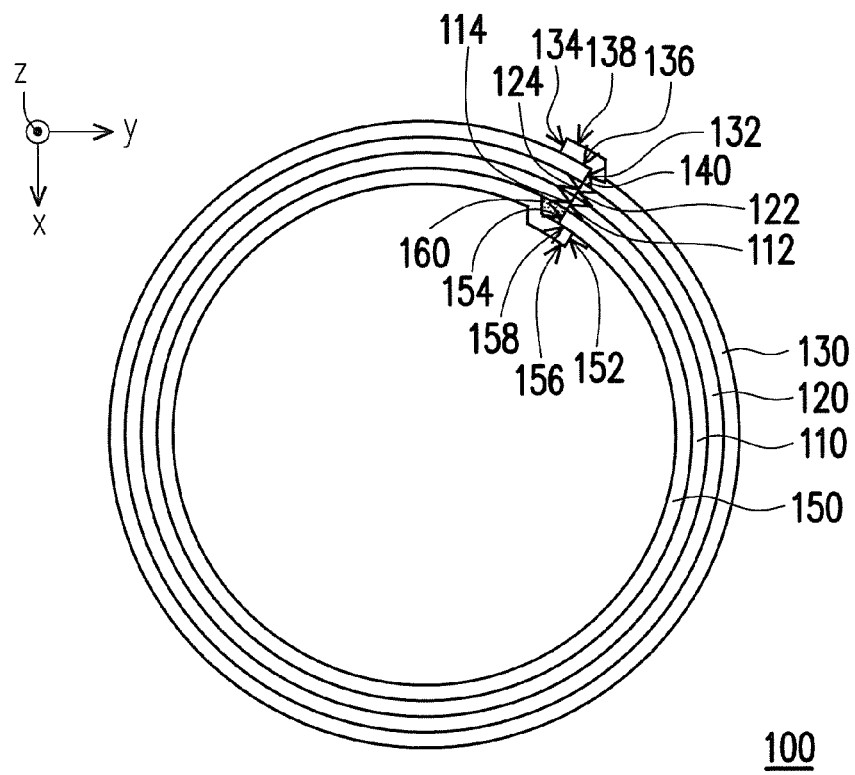
FIG. 2 is a schematic top view illustrating a circular display according to a first embodiment of the invention.
Figure 3:
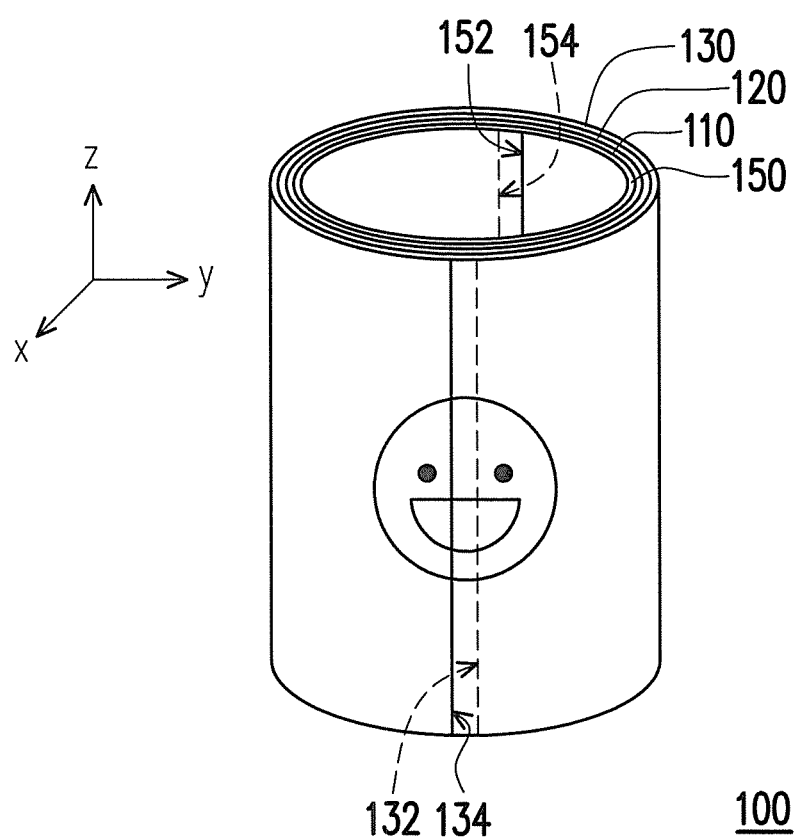
FIG. 3 is a schematic side view illustrating the circular display depicted in FIG. 2.
Figure 4:
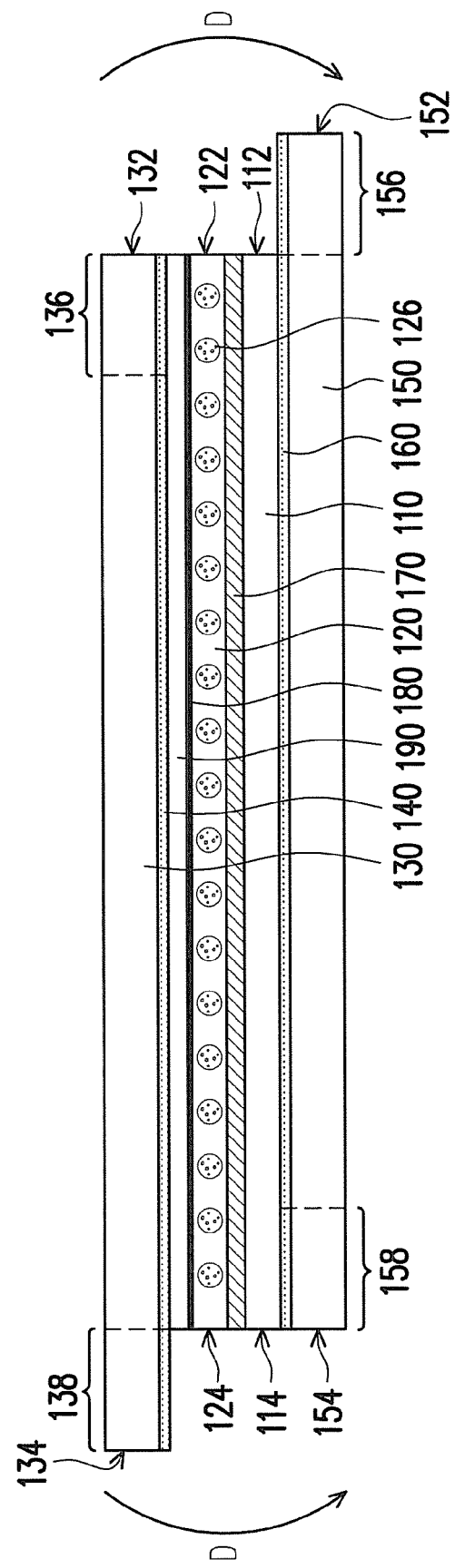
FIG. 4 is a schematic cross-sectional view illustrating the circular display depicted in FIG. 2 before the circular display is bent and shaped as a ring.

FIG. 2 is a schematic top view illustrating a circular display according to a first embodiment of the invention. FIG. 3 is a schematic side view illustrating the circular display depicted in FIG. 2. FIG. 4 is a schematic cross-sectional view illustrating the circular display depicted in FIG. 2 before the circular display is bent and shaped as a ring. Specifically, the stacked structure shown in FIG. 4 may be bent in a bending direction D, so as to form the circular display 100 shown in FIG. 2. For clear illustration, the active device layer 170, the common layer 180, and the carrier 190 shown in FIG. 4 are all omitted in FIG. 2 and FIG. 3. With reference to FIG. 2, FIG. 3, and FIG. 4, the circular display 100 described in the present embodiment includes a carrier 110 and a display medium layer 120 that is located on the carrier 110. The entire area where the display medium layer 120 is located in the circular display 100 is able to display image frames. In the present embodiment, the carrier 110 is flexible. Besides, the carrier 110 is transparent. The carrier 110 is made of plastic, for instance, which should however not be construed as a limitation to the invention. In the present embodiment, the display medium layer 120 is an electronic ink layer, for instance. As shown in FIG. 4, the electronic ink layer includes a plurality of microcapsules 126. Each of the microcapsules 126 contains a plurality of white particles with positive charges and a plurality of black particles with negative charges. However, the invention is not limited to the above descriptions; in another embodiment of the invention, the display medium layer 120 may also be any other display medium layer.

As shown in FIG. 4, the circular display 100 described herein further includes a common electrode layer 180 and an active device layer 170 located between the display medium layer 120 and the carrier 110. In the present embodiment, the display medium layer 120 may be formed on the carrier 190 where the common electrode layer 180 is already formed, and the display medium layer 120 is then adhered to the carrier 110 having the active device layer 170. However, the invention is not limited to the above descriptions; in another embodiment of the invention, the display medium layer 120 may also be formed on the carrier 110 in another manner (e.g., by spraying). The display medium layer 120 is located between the common electrode layer 180 and the active device layer 120. The active device layer 120 includes a plurality of active devices (e.g., thin film transistors) and a plurality of pixel electrodes (not shown) electrically connected to the active devices. The common electrode layer 180 is a transparent conductive layer, for instance. The common electrode layer 180 and the pixel electrodes of the active device layer 170 may collectively drive the display medium layer 120, and thereby the entire area where the display medium layer 120 is located in the circular display 100 is able to display image frames.

With reference to FIG. 2, FIG. 3, and FIG. 4, the display medium layer 120 has two display edges 122 and 124 opposite to each other. The carrier 110 has two carrying edges 112 and 114 opposite to each other. The display edges 122 and 124 are respectively aligned to the carrying edges 112 and 114. As shown in FIG. 2, the carrier 110 and the display medium layer 120 are bent together to form a closed ring, the display edges 122 and 124 of the display medium layer 120 are connected to each other, and the carrying edges 112 and 114 of the carrier 110 are connected to each other. In the present embodiment, the display edges 122 and 124 are in contact with each other, and so are the carrying edges 112 and 114. Note that the carrier 110 is aligned to the display medium layer 120 in the present embodiment; therefore, when the display medium layer 110 and the carrier 120 are rolled up to form the circular display 100, the two display edges 122 and 124 of the display medium layer 120 may be in contact with each other, such that the circular display 100 is able to achieve the favorable display effects shown in FIG. 3 without being affected by any spacer region.

With reference to FIG. 2, FIG. 3, and FIG. 4, the circular display 100 described herein further includes a first protection layer 130. The display medium layer 120 is located between the first protection layer 130 and the carrier 110. The first protection layer 130, the carrier 110, and the display medium layer 120 are bent together to form the closed ring. The first protection layer 130 has two first protection edges 132 and 134 opposite to each other and two first protection edge areas 136 and 138, and each of the two first protection edge areas 136 and 138 respectively has one of the first protection edges 132 and 134. In the present embodiment, the first protection edge 132 of the first protection edge area 136 is aligned to the display edge 122; the first protection edge 134 of the first protection edge area 138 exceeds the display edge 124. That is, a portion of the first protection edge area 138 may exceed the display medium layer 120. In FIG. 2, note that the portion of the first protection edge area 138 exceeding the display medium layer 120 may be stacked onto and fixed to the first protection edge area 136. According to the present embodiment, the first protection layer 130 may be made of a transparent and flexible material, e.g., plastic, which should however not be construed as a limitation to the invention.

Specifically, as shown in FIG. 4, the circular display 100 further includes a first adhesive layer 140 that is located between the first protection layer 130 and the display medium layer 120. The first adhesive layer 140 is further adhered to the portion of the first protection edge area 138 exceeding the display medium layer 120. As shown in FIG. 2, the portion of the first protection edge area 138 exceeding the display medium layer 120 may be fixed to the first protection edge area 136 through the first adhesive layer 140. That is, when the circular display 100 is rolled up to form a closed ring, the first protection edge area 138 of the first protection layer 130 on the exterior of the closed ring is adhered to the first protection edge area 136 of the first protection layer 130. The adhered structure allows each film layer of the circular display 100 to be constantly shaped as a ring, and thereby the display effects of the circular display 100, as shown in FIG. 3, may be accomplished without being affected by any spacer region.

According to the present embodiment, the circular display 100 further includes a second protection layer 150. The carrier 110 is located between the display medium layer 122 and the second protection layer 150. The second protection layer 150, the carrier 110, and the display medium layer 120 are bent together to form the closed ring. The second protection layer 150 has two second protection edges 152 and 154 opposite to each other and two second protection edge areas 156 and 158, and each of the two second protection edge areas 156 and 158 respectively has one of the second protection edges 152 and 154. The second protection edge 154 of the second protection edge area 158 may be aligned to the display edge 124; the second protection edge 152 of the second protection edge area 156 exceeds the display edge 122. That is, a portion of the second protection edge area 156 may exceed the display medium layer 120. In the present embodiment shown in FIG. 2, note that the portion of the second protection edge area 156 exceeding the display medium layer 120 may be stacked onto and fixed to the second protection edge area 158. According to the present embodiment, the second protection layer 150 may be made of a transparent and flexible material, e.g., plastic, which should however not be construed as a limitation to the invention.

Specifically, as shown in FIG. 4, the circular display 100 described herein further includes a second adhesive layer 160 that is located between the second protection layer 150 and the carrier 110. The second adhesive layer 160 is further adhered to the portion of the second protection edge area 156 exceeding the display medium layer 120. As shown in FIG. 2, the portion of the second protection edge area 156 exceeding the display medium layer 120 may be fixed to the second protection edge area 158 through the second adhesive layer 160. That is, when the circular display 100 is rolled up to form a closed ring, the second protection edge area 156 of the second protection layer 150 on the exterior of the closed ring is adhered to the second protection edge area 158 of the second protection layer 150. The adhered structure allows each film layer of the circular display 100 to be constantly shaped as a ring, and thereby the display effects of the circular display 100, as shown in FIG. 3, may be accomplished without being affected by any spacer region.

Second Embodiment

Figure 5:
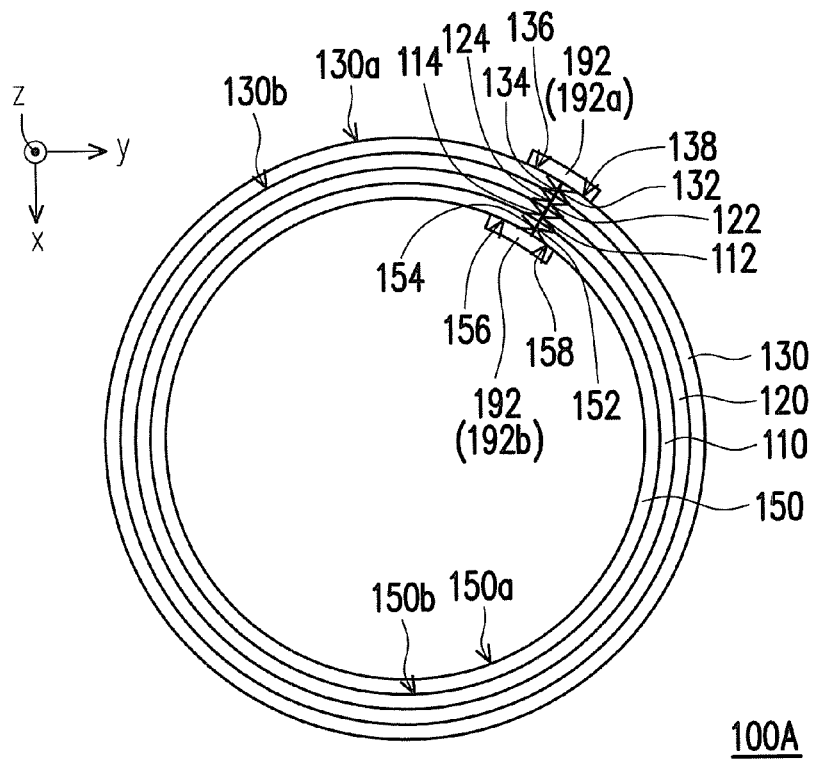
FIG. 5 is a schematic top view illustrating a circular display according to a second embodiment of the invention.
Figure 6:
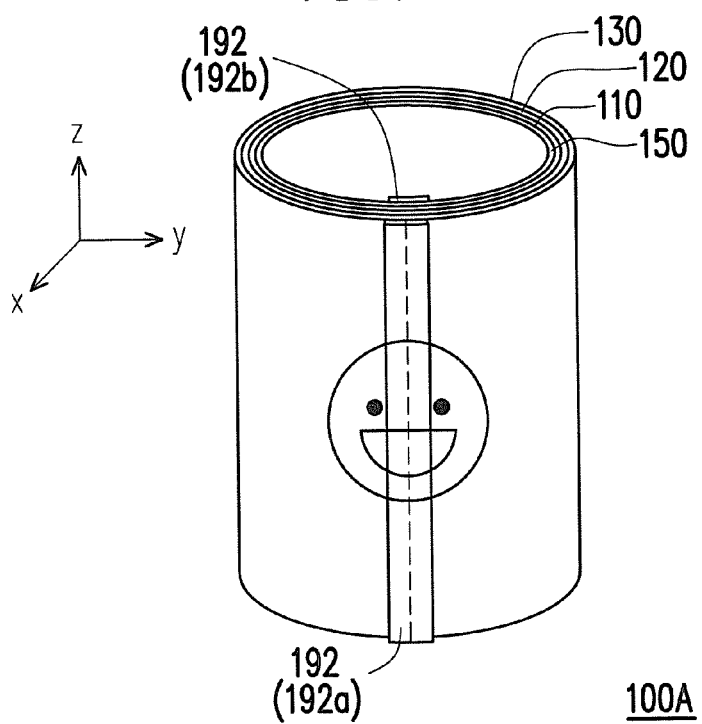
FIG. 6 is a schematic side view illustrating the circular display depicted in FIG. 5.
Figure 7:
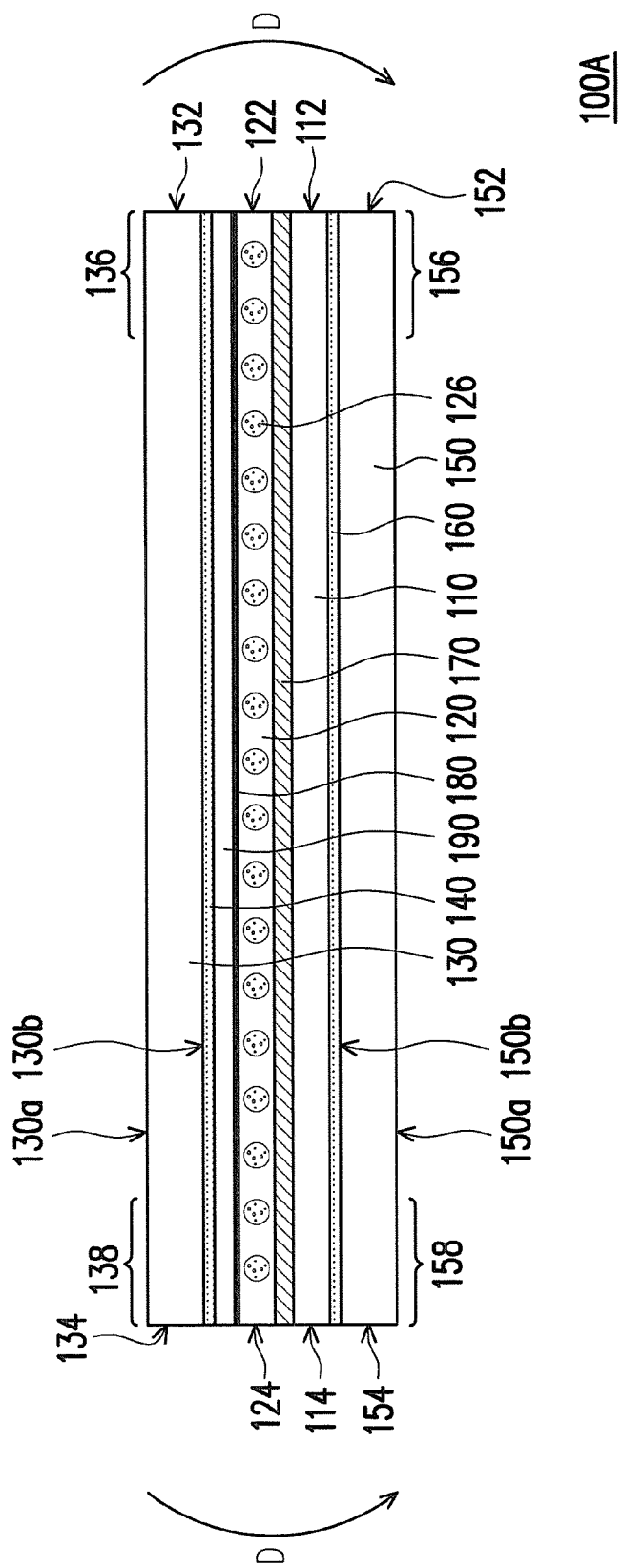
FIG. 7 is a schematic cross-sectional view illustrating the circular display depicted in FIG. 5 before the circular display is bent and shaped as a ring.

FIG. 5 is a schematic top view illustrating a circular display according to a second embodiment of the invention. FIG. 6 is a schematic side view illustrating the circular display depicted in FIG. 5. FIG. 7 is a schematic cross-sectional view illustrating the circular display depicted in FIG. 5 before the circular display is bent and shaped as a ring. Specifically, the stacked structure shown in FIG. 7 may be bent in a bending direction D, so as to form the circular display 100A shown in FIG. 5. For clear illustration, the active device layer 170, the common layer 180, and the carrier 190 shown in FIG. 7 are all omitted in FIG. 5 and FIG. 6. With reference to FIG. 5, FIG. 6, and FIG. 7, the circular display 100A described in the present embodiment is similar to the circular display 100 described in the first embodiment, and therefore the same components are labeled by the same reference numbers. The difference therebetween lies in that the first protection layer 130 and the second protection layer 150 in the circular display 100A are aligned to the display medium layer 120, and the circular display 100A is constantly shaped as a closed ring by means of a fixing member 192. The difference will be explained below, while the similarities may be referred to as the descriptions in the first embodiment and will not be further explained hereinafter.

With reference to FIG. 5, FIG. 6, and FIG. 7, the circular display 100A described in the present embodiment includes a carrier 110 and a display medium layer 120 that is located on the carrier 110. The display medium layer 120 has two display edges 122 and 124 opposite to each other. The carrier 110 has two carrying edges 112 and 114 opposite to each other. The display edges 122 and 124 are respectively aligned to the carrying edges 112 and 114. In the present embodiment, the circular display 100A further includes a first protection layer 130 and a second protection layer 150. The display medium layer 120 is located between the first protection layer 130 and the carrier 110. The carrier 110 is located between the display medium layer 120 and the second protection layer 150. The first protection layer 130 has two first protection edges 132 and 134 opposite to each other. The first protection edges 132 and 134 are respectively aligned to the display edges 122 and 124 of the display medium layer 120. The second protection layer 150 has two second protection edges 152 and 154 opposite to each other. The second protection edges 152 and 154 are respectively aligned to the display edges 122 and 124 of the display medium layer 120.

The first protection layer 130, the second protection layer 150, the carrier 110, and the display medium layer 120 are bent together to form the closed ring. The display edges 122 and 124 of the display medium layer 120 are connected to each other. In the present embodiment, the display edges 122 and 124 may be in contact with each other. The carrying edges 112 and 114 of the carrier 110 are connected to each other. In the present embodiment, the carrying edges 112 and 114 may be in contact with each other. The first protection edges 132 and 134 of the first protection layer 130 are connected to each other. In the present embodiment, the first protection edges 132 and 134 may be in contact with each other. The second protection edges 152 and 154 of the second protection layer 150 are connected to each other. In the present embodiment, the second protection edges 152 and 154 may be in contact with each other.

The fixing member 192 of the circular display 100A described herein fixes the display edges 122 and 124 of the display medium layer 120, the carrying edges 112 and 114 of the carrier 110, the first protection edges 132 and 134, and the second protection edges 152 and 154, so that the circular display 100A may be constantly shaped as the closed ring. In particular, the first protection layer 130 has a first outer surface 130a and a first inner surface 130b opposite to each other. The first inner surface 130b is located between the display medium layer 120 and the first outer surface 130a. The fixing member 192 includes a first adhesive plate 192a. The first adhesive plate 192a is adhered to the areas 136 and 138 having the first protection edges 132 and 134 in the first outer surface 130a of the first protection layer 130. Besides, the first adhesive plate 192a may be transparent. That is, when the circular display 100A is rolled up and shaped as the closed ring, the first adhesive plate 192a on the exterior of the closed ring is adhered to the areas 136 and 138 having the first protection edges 132 and 134 in the first outer surface 130a of the first protection layer 130. The first adhesive plate 192a allows each film layer of the circular display 100A to be constantly in a bent state, and thereby the display effects of the circular display 100A, as shown in FIG. 6, may be accomplished without being affected by any spacer region.

In the present embodiment, the second protection layer 150 has a second outer surface 150a and a second inner surface 150b opposite to each other. The second inner surface 150b is located between the carrier 110 and the second outer surface 150a. The fixing member 192 further includes a second adhesive plate 192b. The second adhesive plate 192b is adhered to the areas 156 and 158 having the second protection edges 152 and 154 in the second outer surface 150a of the second protection layer 150. Besides, the second adhesive plate 192b may be transparent. That is, when the circular display 100A is rolled up and shaped as the closed ring, the second adhesive plate 192b on the interior of the closed ring is adhered to the areas 156 and 158 having the second protection edges 152 and 154 in the second outer surface 150a of the second protection layer 150. The second adhesive plate 192b allows each film layer of the circular display 100A to be constantly in a bent state, and thereby the display effects of the circular display 100A, as shown in FIG. 6, may be accomplished without being affected by any spacer region.

Third Embodiment

Figure 8:
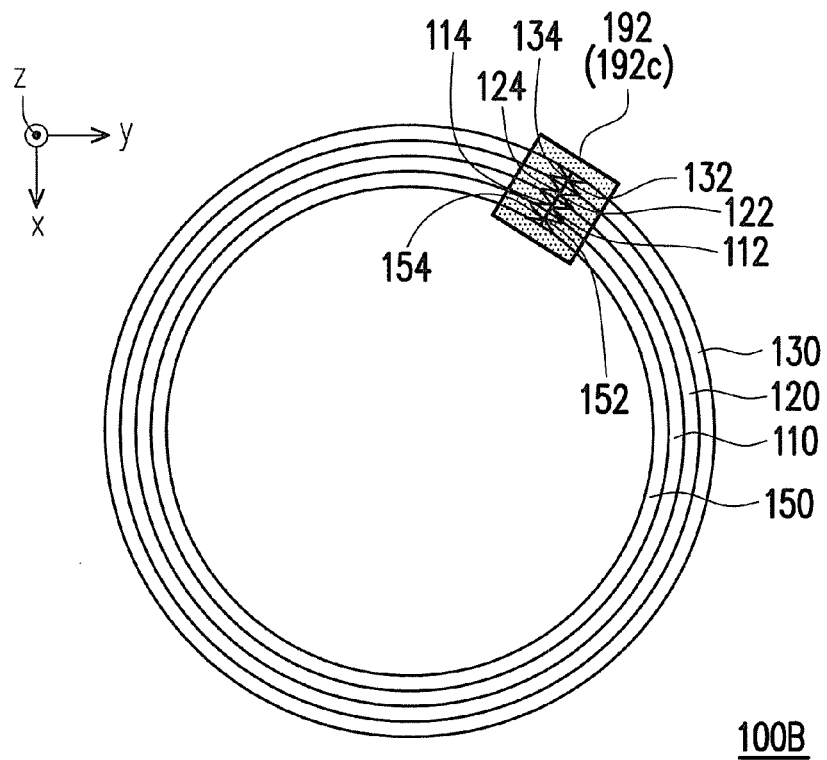
FIG. 8 is a schematic top view illustrating a circular display according to a third embodiment of the invention.
Figure 9:
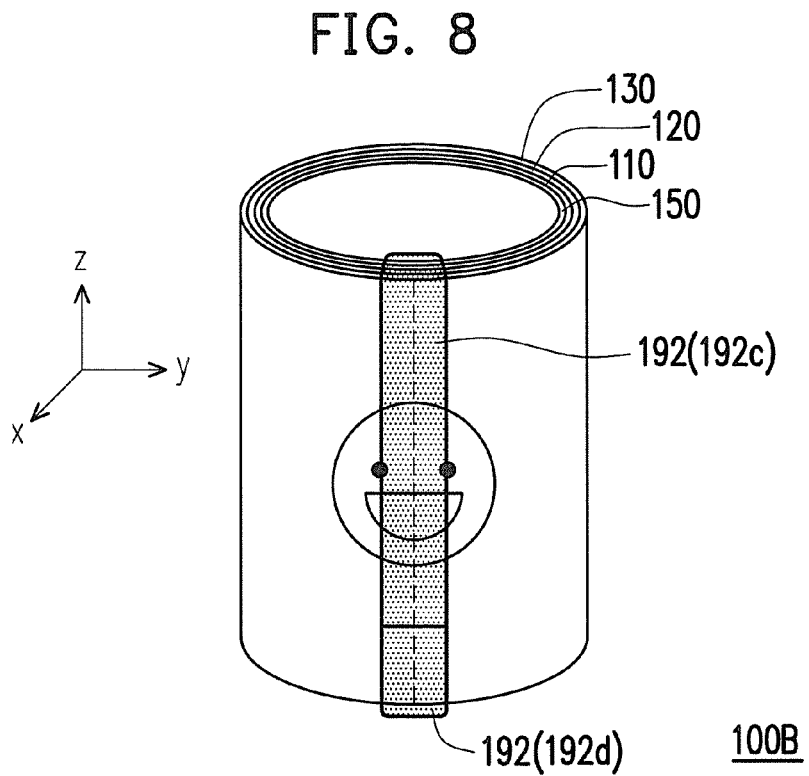
FIG. 9 is a schematic side view illustrating the circular display depicted in FIG. 8.
Figure 10:
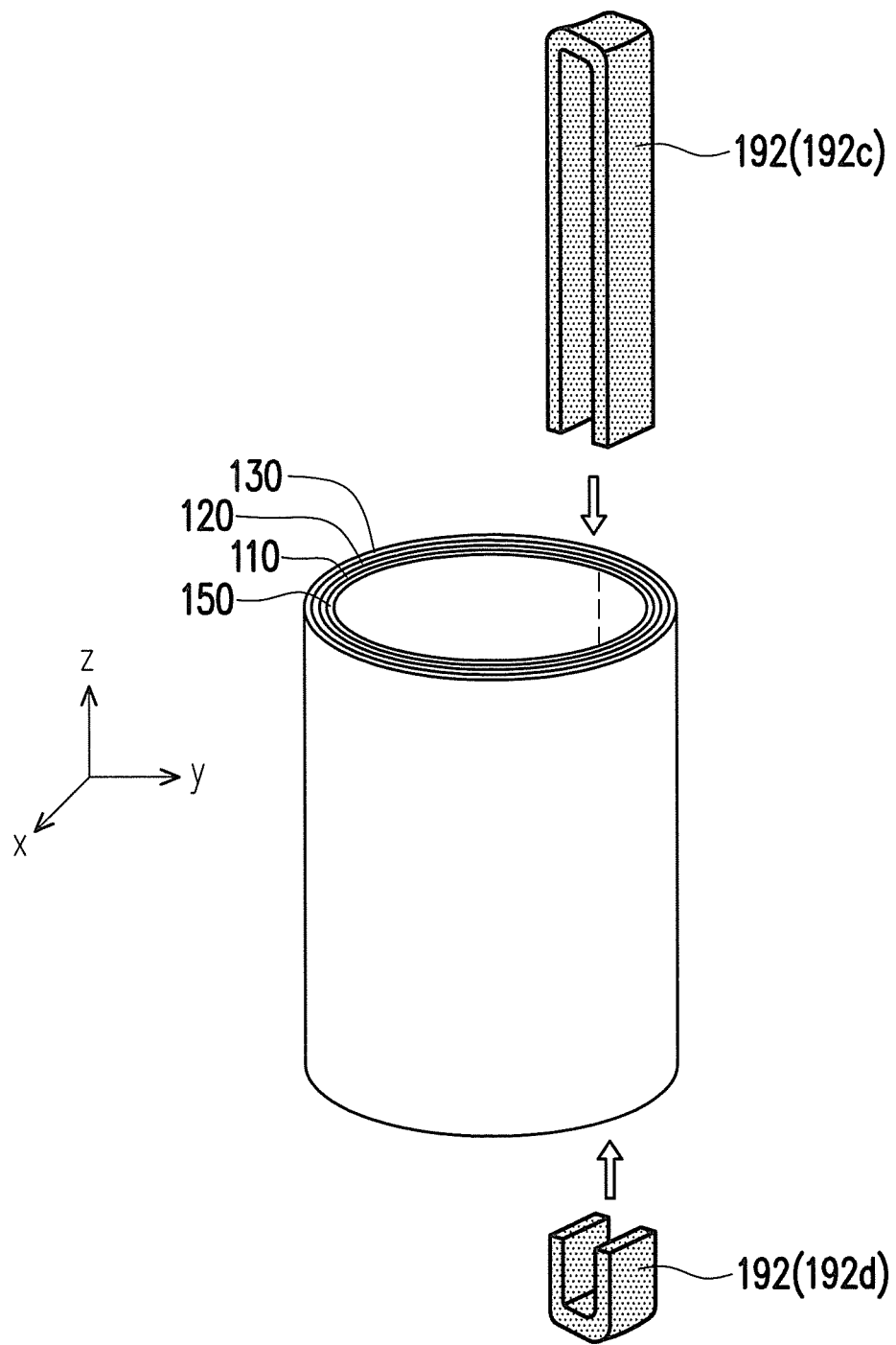
FIG. 10 illustrates that each film layer is fixed by a fixing member to form a closed ring.

FIG. 8 is a schematic top view illustrating a circular display according to a third embodiment of the invention. FIG. 9 is a schematic side view illustrating the circular display depicted in FIG. 8. FIG. 10 illustrates that each film layer is fixed by a fixing member to form a closed ring. The schematic cross-sectional view illustrating the circular display 100B depicted in FIG. 8 before the circular display 100B is bent and shaped as a ring is shown in FIG. 7. With reference to FIG. 7, FIG. 8, and FIG. 9, the circular display 100b described in the present embodiment is similar to the circular display 100A described in the second embodiment, and therefore the same components are labeled by the same reference numbers. The difference therebetween rests in that the fixing member 192 employed by the circular display 100B is different from the fixing member 192 employed by the circular display 100A. The difference will be explained below, while the similarities may be referred to as the descriptions in the second embodiment and will not be further explained hereinafter.

The fixing member 192 in the circular display 100B described herein is a clamping member. The clamping member clamps the areas of the display medium layer 120 having the display edges 122 and 124, the areas of the carrier 110 having the carrying edges 112 and 114, the areas of the first protection layer 130 having the first protection edges 132 and 134, and the areas of the second protection layer 150 having the second protection edges 152 and 154. Specifically, as shown in FIG. 10, the clamping member includes two buckling members 192c and 192d. The stacked structure constituted by the carrier 110, the display medium layer 120, the first protection layer 130, and the second protection layer 150 may be sandwiched between the buckling members 192c and 192d. The buckling members 192c and 192d may be buckled to each other and further clamp the carrier 110, the display medium layer 120, the first protection layer 130, and the second protection layer 150. The clamping member allows each film layer of the circular display 100B to be constantly in a bent state, and thereby the display effects of the circular display 100B, as shown in FIG. 9, may be accomplished without being affected by any spacer region.

Fourth Embodiment

Figure 11:
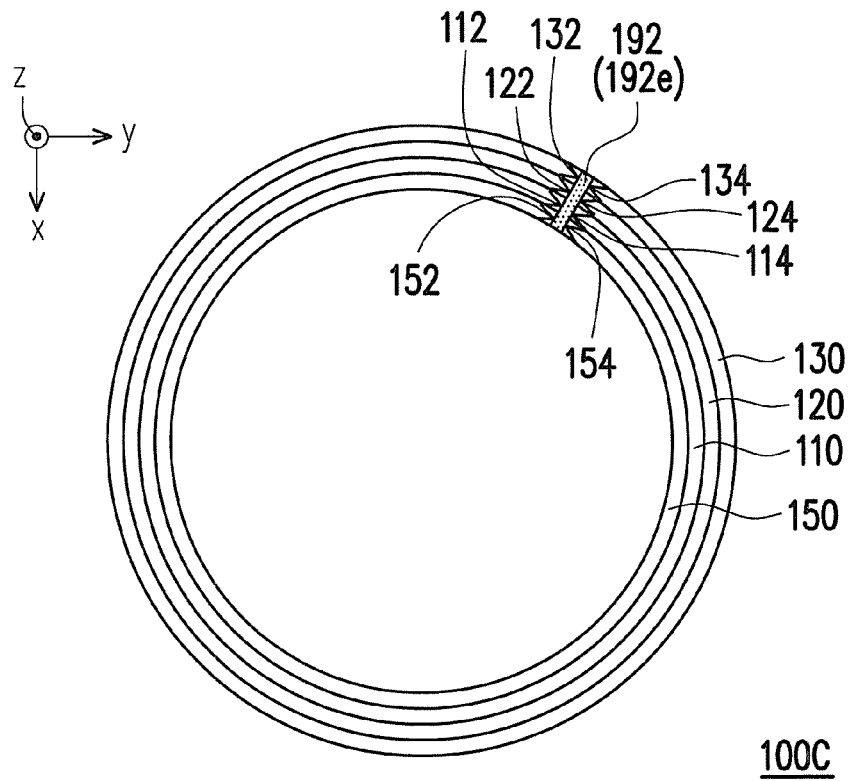
FIG. 11 is a schematic top view illustrating a circular display according to a fourth embodiment of the invention.
Figure 12:
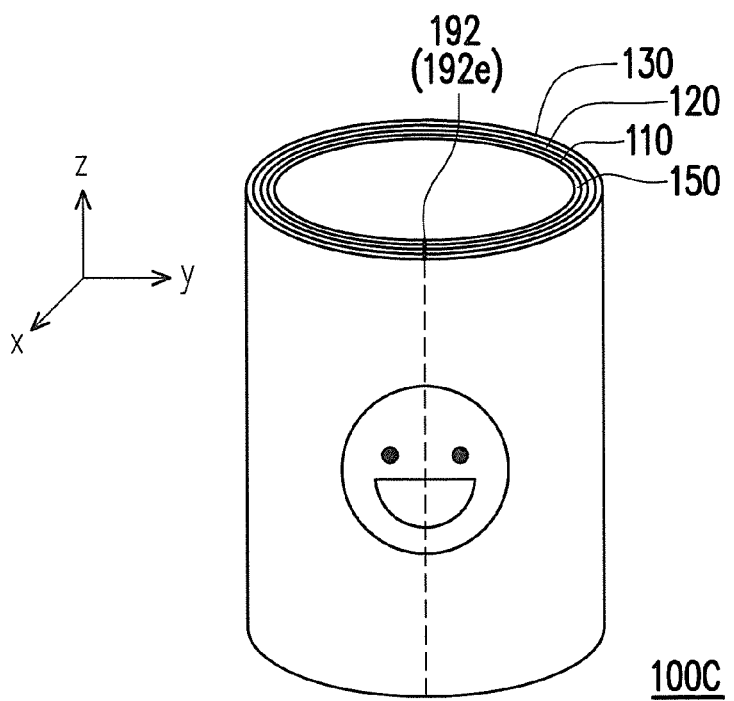
FIG. 12 is a schematic side view illustrating the circular display depicted in FIG. 11.

FIG. 11 is a schematic top view illustrating a circular display according to a fourth embodiment of the invention. FIG. 12 is a schematic side view illustrating the circular display depicted in FIG. 11. The schematic cross-sectional view illustrating the circular display 100C depicted in FIG. 11 before the circular display 100C is bent and shaped as a ring is shown in FIG. 7. With reference to FIG. 7, FIG. 11, and FIG. 12, the circular display 100C described in the present embodiment is similar to the circular display 100A described in the second embodiment, and therefore the same components are labeled by the same reference numbers. The difference therebetween rests in that the fixing member 192 employed by the circular display 100C is different from the fixing member 192 employed by the circular display 100A. The difference will be explained below, while the similarities may be referred to as the descriptions in the second embodiment and will not be further explained hereinafter.

The fixing member 192 in the circular display 100C described herein is a third adhesive layer 192*e*. As shown in FIG. 11, the third adhesive layer 192*e* is located between the display edges 122 and 124 of the display medium layer 120, between the carrying edges 112 and 114 of the carrier 110, between the first protection edges 132 and 134 of the first protection layer 130, and between the second protection edges 152 and 154 of the second protection layer 150. The display edges 122 and 124 of the display medium layer 120 are connected to each other through the third adhesive layer 192*e*. The carrying edges 112 and 114 of the carrier 110 are connected to each other through the third adhesive layer 192*e*. The first protection edges 132 and 134 of the first protection layer 130 are connected to each other through the third adhesive layer 192*e*. The second protection edges 152 and 154 of the second protection layer 150 are connected to each other through the third adhesive layer 192*e*. That is, when the circular display 100C is rolled up and shaped as a closed ring, the third adhesive layer 192*e* allows each film layer of the circular display 100C to be constantly in a bent state, and thereby the carrier 110, the display medium layer 120, the first protection layer 130, and the second protection layer 150 are together bent and shaped as a ring. As a result, the circular display 100C is able to achieve the favorable display effects shown in FIG. 12 without being affected by any spacer region.

To sum up, in the circular display described herein, the carrier that holds the display medium layer is aligned to the display medium layer; therefore, when the display medium layer and the carrier are rolled up to form the circular display, the two display edges of the display medium layer may be in contact with each other or may be very close to and connected to each other, such that the circular display is able to achieve the favorable display effects without being affected by any spacer region.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A circular display comprising:
   a carrier;
   a display medium layer located on the carrier, the display medium layer having two display edges opposite to each other, the carrier having two carrying edges opposite to each other, wherein the display edges are respectively aligned to the carrying edges, the carrier and the display medium layer are bent together to form a closed ring, the display edges of the display medium layer are connected to each other, and the carrying edges of the carrier are connected to each other;
   a first protection layer, the display medium layer being located between the first protection layer and the carrier; and the first protection layer, the carrier, and the display medium layer being bent together to form the closed ring, wherein the first protection layer has two first protection edges opposite to each other and two first protection edge areas, each of the two first protection edge areas respectively has one of the first protection edges, a portion of one of the two first protection edge areas exceeds the display medium layer, the portion of the first protection edge area exceeding the display medium layer is stacked onto and fixed to the other one of the two first protection edge areas, and the first protection edge of the other one of the first protection edge areas is aligned to one of the display edges; and
   an active device layer located between the display medium layer and the carrier, wherein the display edges of the display medium layer are aligned with the active device layer, the display edges of the display medium layer are in contact with each other, and the carrying edges of the carrier are in contact with each other.

2. The circular display as recited in claim 1, further comprising a first adhesive layer located between the first protection layer and the display medium layer, wherein the portion of the first protection edge area exceeding the display medium layer is fixed to the other one of the two first protection edge areas through the first adhesive layer.

3. The circular display as recited in claim 1, further comprising: a second protection layer, the carrier being located between the display medium layer and the second protection layer, the second protection layer, the carrier, and the display medium layer being bent together to form the closed ring, wherein the second protection layer has two second protection edges opposite to each other and two second protection edge areas, each of the two second protection edge areas respectively has one of the second protection edges, a portion of one of the two second protection edge areas exceeds the display medium layer, and the portion of the second protection edge area exceeding the display medium layer is stacked onto and fixed to the other one of the two second protection edge areas.

4. The circular display as recited in claim 3, further comprising a first adhesive layer located between the first protection layer and the carrier, wherein the portion of the first protection edge area exceeding the display medium layer is fixed to the other one of the two first protection edge areas through the first adhesive layer.

5. The circular display as recited in claim 3, wherein the second protection edge of the other one of the second protection edge areas is aligned to one of the display edges.

6. The circular display as recited in claim 1, further comprising a fixing member, the fixing member fixing the display edges of the display medium layer and fixing the carrying edges of the carrier.

7. The circular display as recited in claim 6, further comprising a first protection layer and a second protection layer, the display medium layer being located between the first protection layer and the carrier, the carrier being located between the display medium layer and the second protection layer, the first protection layer having two first protection edges opposite to each other, the second protection layer having two second protection edge areas opposite to each other, the first protection layer, the second protection layer, the carrier, and the display medium layer being bent together to form the closed ring, wherein the first protection edge areas of the first protection layer are connected to each other, and the second protection edge areas of the second protection layer are connected to each other.

8. The circular display as recited in claim 7, wherein the display edges of the display medium layer are in contact with each other, the carrying edges of the carrier are in contact with each other, the first protection edge areas of the first protection layer are in contact with each other, the second protection edge areas of the second protection layer are in contact with each other, and the fixing member fixes the first protection edge areas of the first protection layer and fixes the second protection edge areas of the second protection layer.

9. The circular display as recited in claim 8, wherein the first protection layer has a first outer surface and a first inner surface opposite to each other, the first inner surface is located between the display medium layer and the first outer surface, the fixing member comprises a first adhesive plate adhered to areas having the first protection edge areas in the first outer surface of the first protection layer.

10. The circular display as recited in claim 9, wherein the second protection layer has a second outer surface and a second inner surface opposite to each other, the second inner surface is located between the carrier and the second outer surface, the fixing member further comprises a second adhesive plate adhered to areas having the second protection edge areas in the second outer surface of the second protection layer.

11. The circular display as recited in claim 10, wherein the first adhesive plate and the second adhesive plate are transparent.

12. The circular display as recited in claim 8, wherein the fixing member is a clamping member, and the clamping member clamps an area of the display medium layer having the display edges, an area of the carrier having the carrying edges, an area of the first protection layer having the first protection edge areas, and an area of the second protection layer having the second protection edge areas.

13. The circular display as recited in claim 12, wherein the clamping member is transparent.

14. The circular display as recited in claim 1, further comprising a common electrode layer and the display medium layer is located between the common electrode layer and the active device layer.

15. The circular display as recited in claim 1, wherein the display medium layer is an electronic ink layer.

16. A circular display comprising:
a carrier;
a display medium layer located on the carrier, the display medium layer having two display edges opposite to each other, the carrier having two carrying edges opposite to each other, wherein the display edges are respectively aligned to the carrying edges, the carrier and the display medium layer are bent together to form a closed ring, the display edges of the display medium layer are connected to each other, and the carrying edges of the carrier are connected to each other;
a first protection layer, the carrier being located between the display medium layer and the first protection layer, and the first protection layer, the carrier, and the display medium layer being bent together to form the closed ring, the first protection layer having two first protection edges opposite to each other and two first protection edge areas, each of the two first protection edge areas respectively having one of the first protection edges, a portion of one of the two first protection edge areas exceeding the display medium layer, the portion of the first protection edge area exceeding the display medium layer being stacked onto and fixed to the other one of the two first protection edge areas, and the first protection edge of the other one of the first protection edge areas being aligned to one of the display edges; and
an active device layer located between the display medium layer and the carrier, wherein the display edges of the display medium layer are aligned with the active device layer, the display edges of the display medium layer are in contact with each other, and the carrying edges of the carrier are in contact with each other.

* * * * *